United States Patent
Imai et al.

(10) Patent No.: US 12,024,606 B2
(45) Date of Patent: Jul. 2, 2024

(54) COMPOSITE PREPREG, PREFORM USING THE SAME, FIBER-REINFORCED COMPOSITE MATERIAL ASSEMBLY, AND METHOD FOR PRODUCING THE SAME

(71) Applicant: Toray Industries, Inc., Tokyo (JP)

(72) Inventors: Naokichi Imai, Ehime (JP); Masato Honma, Ehime (JP)

(73) Assignee: Toray Industries, Inc., Tokyo (JP)

(*) Notice: Subject to any disclaimer, the term of this patent is extended or adjusted under 35 U.S.C. 154(b) by 130 days.

(21) Appl. No.: 17/789,839

(22) PCT Filed: Nov. 12, 2020

(86) PCT No.: PCT/JP2020/042311
§ 371 (c)(1),
(2) Date: Jun. 29, 2022

(87) PCT Pub. No.: WO2021/152957
PCT Pub. Date: Aug. 5, 2021

(65) Prior Publication Data
US 2023/0075860 A1    Mar. 9, 2023

(30) Foreign Application Priority Data

Jan. 31, 2020   (JP) .................................. 2020-014581

(51) Int. Cl.
*B29C 70/54*   (2006.01)
*C08J 5/24*   (2006.01)

(52) U.S. Cl.
CPC .............. *C08J 5/243* (2021.05); *B29C 70/54* (2013.01)

(58) Field of Classification Search
None
See application file for complete search history.

(56) References Cited

U.S. PATENT DOCUMENTS

2004/0170554 A1    9/2004   Wadahara et al.
2006/0110599 A1    5/2006   Honma et al.
(Continued)

FOREIGN PATENT DOCUMENTS

JP    58119851 A    7/1983
JP    2003082117 A    3/2003
(Continued)

OTHER PUBLICATIONS

International Search Report and Written Opinion for International Application No. PCT/JP2020/042311, dated Jan. 26, 2021, 5 pages.

Primary Examiner — Alexander S Thomas
(74) Attorney, Agent, or Firm — Buchanan Ingersoll & Rooney PC (57) ABSTRACT

Provided is a composite prepreg including a region (A) containing a thermosetting resin (a) and a reinforcing fiber and a region (B) containing a thermosetting resin (b) and a reinforcing fiber, the composite prepreg satisfying conditions (i) and (ii) or satisfying conditions (ii) and (iii):

(i) The thermosetting resin (b) is a resin having a gel time Tb longer than a gel time Ta of the thermosetting resin (a), and in at least a part of a temperature range of 40° C. or more and 180° C. or less, satisfy Ta/Tb≤0.8;

(ii) A ratio of the region (A) on a surface of the composite prepreg is 20 to 80%; and (iii) The thermosetting resin (b) is a resin having a higher heat generation starting temperature Eb than a heat generation starting temperature Ea of the thermosetting resin (a), and in a differential scanning calorimetry chart obtained by measuring at 5° C./min with 40° C. as a starting temperature, satisfy Eb−Ea≥30.

14 Claims, 4 Drawing Sheets

(56) References Cited

U.S. PATENT DOCUMENTS

2020/0399462 A1   12/2020  Misumi et al.
2021/0115209 A1    4/2021  Furuhashi et al.

FOREIGN PATENT DOCUMENTS

| JP | 2010031088 A | 2/2010 |
|---|---|---|
| JP | 2012054464 A | 3/2012 |
| JP | 2019167429 A | 10/2019 |
| WO | 2004060658 A1 | 7/2004 |
| WO | 2019167579 A1 | 9/2019 |
| WO | 2019244994 A1 | 12/2019 |

COMPOSITE PREPREG, PREFORM USING THE SAME, FIBER-REINFORCED COMPOSITE MATERIAL ASSEMBLY, AND METHOD FOR PRODUCING THE SAME

CROSS REFERENCE TO RELATED APPLICATIONS

This is the U.S. National Phase application of PCT/JP2020/042311, filed Nov. 12, 2020 which claims priority to Japanese Patent Application No. 2020-014581, filed Jan. 31, 2020, the disclosures of each of these applications being incorporated herein by reference in their entireties for all purposes.

FIELD OF THE INVENTION

The present invention relates to a prepreg that enables easy joining of a thermosetting fiber-reinforced composite material and is used to form an assembly having excellent joining strength.

BACKGROUND OF THE INVENTION

Fiber-reinforced composite materials in which a thermosetting resin or a thermoplastic resin is used as a matrix resin and is combined with reinforcing fibers such as carbon fibers and glass fibers are lightweight and have excellent mechanical characteristics such as strength and rigidity, heat resistance, and corrosion resistance, and therefore have been used in many fields such as aerospace, automobiles, railway vehicles, ships, civil engineering and construction, and sporting goods.

In general, fiber-reinforced composite materials are unsuitable for producing parts or molded bodies having a complicated shape in a single molding process; to form a complicated shape, it is necessary to produce a member including a fiber-reinforced composite material and then to join the member to another member. In the case of being used as a structural component or a sub-structural component for an aircraft or an automobile, currently, a joining method using an adhesive or a joining method by mechanical fastening with a rivet or the like is used. However, when an adhesive is used, joining failure due to peeling or the like may occur at the boundary surface between the molded body of the fiber-reinforced composite material and the other member. In addition, in the case of mechanical fastening, there is the problem that the strength of the hole portion may be reduced because a hole is made in the fiber-reinforced composite material and the other member.

A fiber-reinforced composite material containing a thermoplastic resin as a matrix resin can be joined to other members containing thermoplastic resin by heat welding, so that it can be said that the process is relatively easily simplified. For example, Patent Document 1 discloses a laminate made of a fiber-reinforced resin in which a thermosetting resin layer and a thermoplastic resin layer are joined to form a boundary surface having an irregular shape, and according to such a method, an assembly having excellent joining strength is obtained.

PATENT DOCUMENT

Patent Document 1: WO2004/060658 A

SUMMARY OF THE INVENTION

In the joining technique using a thermoplastic resin described in Patent Document 1, a joint surface is remelted and peeled off at a high temperature, and heat resistance may be a problem. For this reason, there has been a demand for a simple joining technique with other members that uses a thermosetting resin and achieves excellent joining strength. In particular, when the thermosetting resin is sufficiently heated and cured, the thermosetting resin does not remelt and thus has excellent heat resistance; but after curing, it is difficult for the thermosetting resin to firmly join to other members. For this reason, for example, when it is necessary to join two or more members, sufficient joining strength may not be obtained for all the members that need to be joined because the curing reaction has sufficiently proceeded.

An object of the present invention is to provide a prepreg that enables a thermosetting fiber-reinforced composite material to be easily joined to other members, particularly two or more members, with excellent joining strength.

The present invention according to various embodiments for solving the above problems is characterized mainly by a composite prepreg comprising a region (A) containing a thermosetting resin (a) and a reinforcing fiber, and a region (B) containing a thermosetting resin (b) and a reinforcing fiber, the composite prepreg satisfying conditions (i) and (ii) or satisfying conditions (ii) and (iii).

(i) The thermosetting resin (b) is a resin having a gel time longer than a gel time of the thermosetting resin (a), and in at least a part of a temperature range of 40° C. or more and 180° C. or less, a gel time Ta of the thermosetting resin (a) and a gel time Tb of the thermosetting resin (b) satisfy Ta/Tb 0.8.

(ii) A ratio of the region (A) on a surface of the composite prepreg is 20 to 80%.

(iii) The thermosetting resin (b) is a resin having a higher heat generation starting temperature than a heat generation starting temperature of the thermosetting resin (a), and in a differential scanning calorimetry chart obtained by measuring at 5° C./min with 40° C. as a starting temperature, a heat generation starting temperature Ea of the thermosetting resin (a) and a heat generation starting temperature Eb of the thermosetting resin (b) satisfy Eb−Ea≥30.

The present invention according to various embodiments also includes a composite prepreg that satisfies all of the conditions (i) to (iii).

According to exemplary embodiments of the composite prepreg of the present invention, it is possible to join a thermosetting fiber-reinforced composite material and another member easily and with excellent strength, and it is also possible to easily perform joining to two or more members.

DETAILED DESCRIPTION OF EMBODIMENTS OF THE INVENTION

The present invention will be described below.
<Composite Prepreg>

A composite prepreg according to embodiments of the present invention includes a region (A) containing a thermosetting resin (a) and reinforcing fibers and a region (B) containing a thermosetting resin (b) and reinforcing fibers. Since each of the region (A) and the region (B) having different curing behaviors can be formed on the surface with such a configuration, it is possible to increase the number of times that joining to other members is possible as compared with a prepreg containing a single thermosetting resin, and it is excellent in terms of the degree of freedom in design in the joining step. Hereinafter, the composite prepreg according to embodiments of the present invention will be described with reference to the drawings as appropriate; however, the present invention is not limited to these drawings. However, as will be readily understood by those skilled in the art, the description of the embodiments described in the drawings may also serve as a description of the composite prepreg of the present invention as a superordinate concept.

Figure 1:
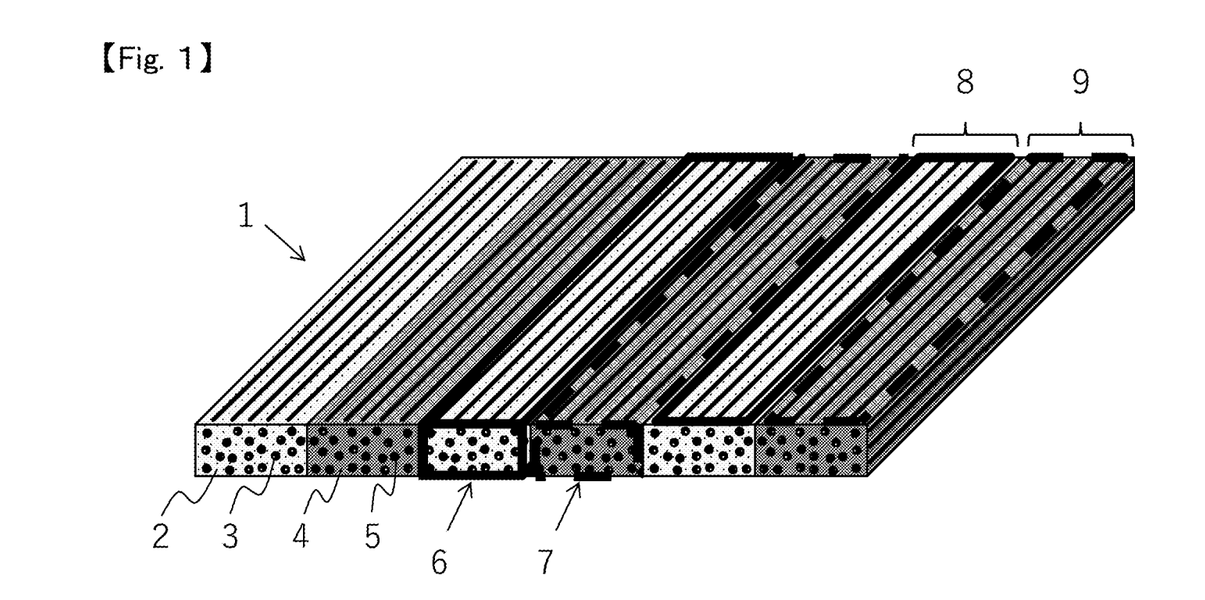
FIG. 1 is a schematic view showing an embodiment of a composite prepreg in which regions (A) and regions (B) are distributed in a stripe shape in an in-plane direction on both surfaces.
Figure 2:
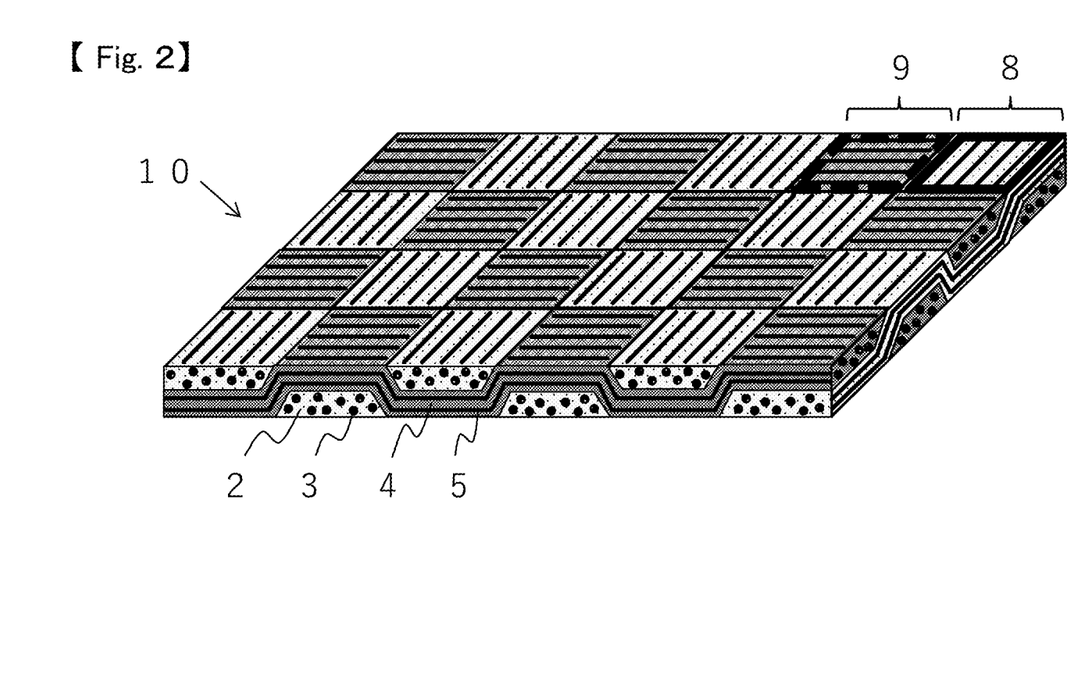
FIG. 2 is a schematic view showing an embodiment of a composite prepreg in which regions (A) and regions (B) are distributed in a patchwork shape in an in-plane direction on both surfaces.

FIG. 1 is a schematic view showing an embodiment of the composite prepreg according to the present invention in which a region (A) 6 and a region (B) 7 are distributed in a stripe shape in an in-plane direction on a surface. As shown in FIG. 1, by alternately arraying the regions (A) and (B) in the in-plane direction, region (A) 8 and region (B) 9 appearing on a surface of the composite prepreg are alternately present in a stripe shape. FIG. 2 is a schematic view showing an embodiment of a composite prepreg in which the region (A) 8 and the region (B) 9 are distributed in a patchwork shape in an in-plane direction on the surface. In this embodiment, the regions (A) and the regions (B) cross each other to form a composite prepreg while reinforcing each other, and the region (A) 8 and the region (B) 9 on the surface of the composite prepreg obtained by such a form exist in a patchwork shape in the in-plane direction. As shown in these examples, in the composite prepreg of the present invention, both the region (A) and the region (B) exist on the surface thereof.

In the present invention, a first aspect of the composite prepreg satisfies conditions (i) and (ii). The thermosetting resin (b) in this aspect is a thermosetting resin having a longer gel time, that is, a longer time required for curing, than the thermosetting resin (a). By using a composite prepreg in which there is a significant difference in gel time between the thermosetting resin (a) and the thermosetting resin (b), a plurality of curing behaviors can be used in combination in a single prepreg, and a thermosetting fiber-reinforced composite material can be joined in a simple manner with excellent joining strength. Specifically, the following condition (i) is satisfied.

(i) The thermosetting resin (b) is a resin having a gel time longer than that of the thermosetting resin (a), and in at least a part of a temperature range of 40° C. or more and 180° C. or less, a gel time Ta of the thermosetting resin (a) and a gel time Tb of the thermosetting resin (b) satisfy Ta/Tb 0.8.

By satisfying the condition (i), it is possible to obtain a composite prepreg in which the thermosetting resin (b) is in an uncured state while the thermosetting resin (a) is a cured product in a state, where the thermosetting resin (a) and the thermosetting resin (b) coexist. The ratio Ta/Tb is preferably 0.7 or less, and more preferably 0.6 or less. Within such a range, it is possible to lengthen the time during which the thermosetting resin (b) can be in an uncured state with respect to the time required for curing the thermosetting resin (a), and the workability is excellent. The ratio Ta/Tb is preferably 0.1 or more, more preferably 0.3 or more, and most preferably 0.5 or more. Within such a range, the time required for further curing the thermosetting resin (b) after curing the thermosetting resin (a) can be shortened, and as a result, the joining time can be shortened.

The gel time of the thermosetting resin in the present specification is a value measured from the time variation of the rotation torque on a curelastometer. That is, the heating rate is controlled at 1.7° C./min to a predetermined temperature of 40° C. or higher and 180° C. or lower, with 40° C. as the heating starting point, and then the time required until the rotation torque exceeds 1 dNm due to the progress of the curing reaction is measured while maintaining the predetermined temperature, and the time required until the torque exceeds 1 dNm from the heating starting point can be determined as the gel time. For example, in the case where the gel time is measured at 180° C., the heating rate is controlled at 1.7° C./min to 180° C., with 40° C. as the heating starting point, and then the time required until the rotation torque exceeds 1 dNm due to the progress of the curing reaction is measured while maintaining the temperature at 180° C., and the time required until the torque exceeds 1 dNm from the heating starting point can be determined as the gel time. In embodiments of the present invention, if there is such a difference in gel time between the thermosetting resin (a) and the thermosetting resin (b) in at least a part of the temperature range of 40° C. or higher and 180° C. or lower, the above sequential curing can be performed by adopting the temperature range as the curing temperature.

From the viewpoint of workability, Ta/Tb is preferably in the above range in at least a part of the temperature range of 100° C. or higher and 180° C. or lower, and more preferably in the above range at 180° C.

Further, Ta/Tb is preferably in the above range in the overall temperature range of 100° C. or higher and 180° C. or lower, and more preferably in the above range in the overall temperature range of 40° C. or higher and 180° C. or lower. By using the thermosetting resin (a) and the thermosetting resin (b) making such a combination, the degree of freedom of production conditions in the case of producing a fiber-reinforced composite material assembly to be described later can be increased.

The prepreg according to an embodiment of the present invention satisfies the following condition (ii).

(ii) The area ratio of the region (A) on the surface of the composite prepreg is 20 to 80%.

The area ratio of the region (A) on the composite prepreg surface is an area ratio [%] obtained by dividing the sum of the area of the region (A) occupying a certain surface of the prepreg by the sum of the area of the region (A) and the area of the region (B) on the surface and multiplying the result by 100. The area ratio is preferably 30 to 70%, more preferably 40 to 60%, and still more preferably 45 to 55%. Within this range, when the composite prepreg is used as an adhesive layer, the region (B) containing the thermosetting resin (b) that cures slower than the thermosetting resin (a) can be left in a sufficient area on the prepreg surface in an uncured state even after the bonding step via curing of the region (A), and another adherend can be further joined via this region (B).

Although there are two surfaces of the composite prepreg in a relationship of front and back in the out-of-plane direction (a direction orthogonal to the in-plane direction, that is, a direction perpendicular to the prepreg surface), in embodiments of the present invention, the ratio of the region (A) in the surface of the composite prepreg satisfies the condition (ii) on each of the front and back surfaces. An exposed plane extending in the out-of-plane direction at an end of the composite prepreg is referred to as a side surface in the present specification.

In the present invention, a second aspect of the composite prepreg satisfies the condition (ii) above and a condition (iii) described later. The thermosetting resin (b) in this aspect is a thermosetting resin having a higher heat generation starting temperature, that is, a higher temperature required for starting the curing reaction, than the thermosetting resin (a). By using a composite prepreg in which there is a significant difference in curing temperature between the thermosetting resin (a) and the thermosetting resin (b), a plurality of curing behaviors can be used in combination in a single prepreg, and a thermosetting fiber-reinforced composite material can be joined in a simple manner with excellent joining strength. Specifically, the condition (iii) is as follows.

(iii) The thermosetting resin (b) is a resin having a higher heat generation starting temperature than the thermosetting resin (a), and in a differential scanning calorimetry chart obtained by measuring at 5° C./min with 40° C. as a starting temperature, the relationship between a heat generation starting temperature Ea of the thermosetting resin (a) and a heat generation starting temperature Eb of the thermosetting resin (b) is Eb−Ea≥30.

By satisfying the condition (iii), it is possible to obtain a composite prepreg in which the thermosetting resin (b) is in an uncured state while the thermosetting resin (a) is a cured product in a state in which the thermosetting resin (a) and the thermosetting resin (b) coexist. The upper limit of Eb−Ea is preferably 200 or less, more preferably 150 or less, still more preferably 100 or less, and the lower limit is preferably 30 or more, more preferably 45 or more, still more preferably 50 or more. Within such a range, it is possible to lengthen the time during which the thermosetting resin (b) can be in an uncured state even after the curing reaction of the thermosetting resin (a) starts in association with the temperature rise, and the workability is excellent.

The heat generation starting temperature of the thermosetting resin in the present specification is a value measured from the time variation of the calorific value measured with a differential scanning calorimeter. That is, the heating start temperature is set to 40° C., the heating rate is controlled at 5° C./min to a predetermined temperature of 40° C. or higher and 300° C. or lower, and the rising point of the exothermic peak (point at which 0.2 W/g of heat is generated from the baseline) is set to the heat generation starting temperature in a differential scanning calorimetry chart obtained by measuring and plotting the amount of heat generated by the curing reaction of the thermosetting resin during the measurement.

From the viewpoint of workability, Ea is preferably 40° C. or higher and 200° C. or lower, and more preferably 100° C. or higher and lower than 150° C. Eb is preferably 100° C. or higher and 300° C. or lower, and more preferably 150° C. or higher and 200° C. or lower. By controlling each of Ea and Eb within such a range and then combining them, the curing reaction in the case of producing a fiber-reinforced composite material assembly to be described later is easily controlled, and workability is excellent.

In the composite prepreg according to embodiments of the present invention satisfying the above conditions (i) and (ii) or conditions (ii) and (iii), it is preferable that the region (A) and the region (B) are distributed in a stripe shape or a patchwork shape in the in-plane direction on the surface. The stripe shape refers to, for example, a state in which regions (A) continuous over the entire length of the composite prepreg and regions (B) continuous over the entire length of the composite prepreg appear alternately on the surface of the composite prepreg as shown in FIG. 1. In the embodiment shown in FIG. 1, rectangular regions (A) and similarly rectangular regions (B), sharing long sides, alternately appear on both surfaces of the composite prepreg. Both the region (A) and the region (B) appearing on the surface are not limited to the rectangular shape but may have a square shape or a trapezoidal shape. The patchwork shape means a state in which regions (A) and regions (B) each having a polygonal shape, preferably a quadrangular shape, share two or more sides on the prepreg surface as shown in FIG. 2. It is preferable that the regions (A) and the regions (B) are distributed in a stripe shape or a patchwork shape in the in-plane direction because the joining strength is easily made uniform in the in-plane direction of the composite prepreg. From the viewpoint of homogeneity of joining strength, it is more preferable that both regions are distributed in a patchwork shape on the surface of the composite prepreg.

When the regions (A) and the regions (B) are distributed in a patchwork shape on the surface of the composite prepreg, a region (A) continuous in one direction and a region (B) continuous in a direction intersecting the direction may cross each other as shown in FIG. 2. In this case, the region (A) and the region (B) overlap in the out-of-plane direction. The composite prepreg obtained by such a configuration is preferable because each of the regions (A) and the regions (B) exposed to the surface is continuous inside the composite prepreg, and the joining strength can be enhanced also by the reinforcing effect by the reinforcing fibers.

In the composite prepreg according to embodiments of the present invention, the regions (A) and the regions (B) may not overlap in the out-of-plane direction. By disposing the regions (A) and the regions (B) so as not to overlap each other in the out-of-plane direction as in the embodiment of FIG. 1, the thickness in the out-of-plane direction can be reduced as compared with the case where the regions (A) and the regions (B) intersect each other as in the embodiment of FIG. 2.

In the present invention, it is preferable that the region (A) is constituted of a strand-shaped prepreg (A') containing the thermosetting resin (a) and reinforcing fibers and that the region (B) is constituted of a strand-shaped prepreg (B') containing the thermosetting resin (b) and reinforcing fibers. Here, the strand-shaped prepreg is obtained by impregnating a reinforcing fiber bundle in which a plurality of reinforcing fibers are aligned in one direction with an uncured thermosetting resin. With such a configuration, in the production of the composite prepreg, the handleability is improved even in the case of a complicated arrangement, and the producibility of the composite prepreg is improved.

Further, in embodiments of the present invention, in the composite prepreg, the strand-shaped prepreg (A') and the strand-shaped prepreg (B') are preferably arranged in a sheet shape having a woven structure. The woven structure here refers to a state in which strand-shaped prepregs are interlaced while overlapping in the out-of-plane direction, and examples of the woven structure include plain weave, twill weave, and satin weave. Among them, a plain weave in which the strand-shaped prepreg (A') and the strand-shaped prepreg (B') are orthogonal to each other as shown in the example of FIG. 2 is preferable. This structure makes it possible to expose the region (A) and the region (B) on the surface of the composite prepreg while forming an anchoring between the region (A) and the region (B) inside the composite prepreg and is preferable because both the strength of the obtained composite prepreg itself and the joining strength to an adherend as an adhesive layer are excellent.

In embodiments of the present invention, in the composite prepreg, it is also preferable that the strand-shaped prepreg (A') and the strand-shaped prepreg (B') are arranged in parallel. Arrangement in parallel means that the strand-shaped prepregs are arranged in the in-plane direction such that the respective side surfaces are in contact with each other, and typically, as shown in the embodiment of FIG. 1, a state in which the strand-shaped prepregs (A') and the strand-shaped prepregs (B') are alternately arranged in the in-plane direction while the respective side surfaces are in contact with each other can be exemplified. With such a structure, it is possible to obtain a composite prepreg in which the thermosetting resin (a) and the thermosetting resin (b) are exposed while reducing the thickness of the composite prepreg. In the present aspect, the strand-shaped prepreg (A') and the strand-shaped prepreg (B') are not necessarily arranged alternately, and there may be a portion where any of the strand-shaped prepregs is arranged continuously.

The number of reinforcing fibers contained in each of the strand-shaped prepreg (A') and the strand-shaped prepreg (B') is preferably 10 or more and 800,000 or less. This range is preferable because the ratio of the region (A) on the surface of the composite prepreg and the distribution state thereof can be controlled. The number of the reinforcing fibers is more preferably 100 or more and 500,000 or less, still more preferably 1,000 or more and 100,000 or less, and most preferably 2,500 or more and 25,000 or less. This range is preferable because the productivity when a composite prepreg is produced from strand-shaped prepregs and the joining strength of the resulting composite prepreg are excellent.

The numbers of reinforcing fibers respectively contained in the strand-shaped prepreg (A') and the strand-shaped prepreg (B') may be the same or different from each other and can be appropriately selected according to the desired form and producibility of the composite prepreg.

<Thermosetting Resin>

Examples of the thermosetting resin include unsaturated polyester resins, vinyl ester resins, epoxy resins, phenol resins, urea resins, melamine resins, polyimide resins, cyanate ester resins, bismaleimide resins, benzoxazine resins, copolymers or modified products thereof, and resins obtained by blending at least two kinds thereof. To improve impact resistance, an elastomer or a rubber component may be added to the thermosetting resin.

Of these, the epoxy resins are preferable from the viewpoints of their excellent mechanical characteristics, heat resistance, and adhesiveness to the reinforcing fibers and easy design of the gel time and heat generation starting temperature. Examples of the main agent of the epoxy resin include bisphenol type epoxy resins such as bisphenol A type epoxy resin, bisphenol F type epoxy resin, bisphenol AD type epoxy resin, and bisphenol S type epoxy resin; brominated epoxy resins such as tetrabromobisphenol A diglycidyl ether; epoxy resins having a biphenyl skeleton; epoxy resins having a naphthalene skeleton; epoxy resins having a dicyclopentadiene skeleton; novolac type epoxy resins such as phenol novolac type epoxy resins and cresol novolac type epoxy resins; glycidyl amine type epoxy resins such as N,N,O-triglycidyl-m-aminophenol, N,N,O-triglycidyl-p-aminophenol, N,N,O-triglycidyl-4-amino-3-methylphenol, N,N,N',N'-tetraglycidyl-4,4'-methylenedianiline (hereinafter may be referred to as "tetraglycidyldiaminodiphenylmethane"), N,N,N',N'-tetraglycidyl-2,2'-diethyl-4,4'-methylenedianiline, N,N,N',N'-tetraglycidyl-m-xylylenediamine, N,N-diglycidylaniline, and N,N-diglycidyl-o-toluidine; resorcinol diglycidyl ether; and triglycidyl isocyanurate. Among them, an epoxy resin containing three or more glycidyl groups in one molecule is preferable because a cured product having a high glass transition temperature can be obtained.

Examples of a curing agent of the epoxy resin include dicyandiamide, an aromatic amine compound, a phenol novolac resin, a cresol novolac resin, a polyphenol compound, an imidazole derivative, tetramethylguanidine, a thiourea-added amine, a carboxylic acid hydrazide, a carboxylic acid amide, and a polymercaptan. In particular, an aromatic amine curing agent is preferable because a cured product of the epoxy resin having good heat resistance can be obtained when the aromatic amine curing agent is used as the curing agent. Examples of the aromatic amine compound include 3,3'-diisopropyl-4,4'-diaminodiphenyl sulfone, 3,3'-di-t-butyl-4,4'-diaminodiphenyl sulfone, 3,3'-diethyl-5,5'-dimethyl-4,4'-diaminodiphenyl sulfone, 3,3'-diisopropyl-5,5'-dimethyl-4,4'-diaminodiphenyl sulfone, 3,3'-di-t-butyl-5,5'-dimethyl-4,4'-diaminodiphenyl sulfone, 3,3',5,5'-tetraethyl-4,4'-diaminodiphenyl sulfone, 3,3'-diisopropyl-5,5'-diethyl-4,4'-diaminodiphenyl sulfone, 3,3'-di-t-butyl-5,5'-diethyl-4,4'-diaminodiphenyl sulfone, 3,3',5,5'-tetraisopropyl-4,4'-diaminodiphenyl sulfone, 3,3'-di-t-butyl-5,5'-diisopropyl-4,4'-diaminodiphenyl sulfone, 3,3',5,5'-tetra-t-butyl-4,4'-diaminodiphenyl sulfone, 4,4'-diaminodiphenyl sulfone, 3,3'-diaminodiphenyl sulfone, 4,4'-diaminodiphenyl ketone, 4,4'-diaminodiphenylphosphinic acid, 4,4'-diaminobenzanilide, diethyltoluenediamine, and 4,4'-diaminodiphenylmethane. These aromatic amine compounds may be used singly or in mixture of two or more kinds as appropriate.

In the present invention, in the first aspect of the composite prepreg described above, the thermosetting resin (a) and the thermosetting resin (b) are different resins from each other having a significant difference in gel time, that is, a time required for curing the thermosetting resin, and the thermosetting resin (b) is a thermosetting resin having a longer gel time than the thermosetting resin (a). To easily achieve such a configuration, it is preferable to appropriately select a curing agent, out of the main agent and the curing agent of the thermosetting resin. From the viewpoint of shortening the gel time, it is preferable to use 4,4'-diaminodiphenyl ketone or 4,4'-diaminodiphenylphosphinic acid as a part or the whole of the curing agent for the thermosetting resin (a).

In the present invention, in the second aspect of the composite prepreg described above, the thermosetting resin (a) and the thermosetting resin (b) are different resins from each other having a significant difference in heat generation starting temperature, that is, a temperature required for the curing reaction of the thermosetting resin, and the thermosetting resin (b) is a thermosetting resin having a higher heat generation starting temperature than the thermosetting resin (a). To easily achieve such a configuration, it is preferable to appropriately select a curing agent, out of the main agent and the curing agent of the thermosetting resin. From the viewpoint of lowering the heat generation starting temperature to accelerate curing, it is preferable to use 4,4'-diaminobenzanilide, diethyltoluenediamine, or 4,4'-diaminodiphenylmethane as apart or the whole of the curing agent for the thermosetting resin (a), and from the viewpoint of handleability, it is more preferable to use diethyltoluenediamine. From the viewpoint of increasing the heat generation starting temperature to delay curing, it is preferable to use 4,4'-diaminodiphenyl sulfone or 3,3'-diaminodiphenyl sulfone as a part or the whole of the curing agent for the thermosetting resin (b), and from the viewpoint of the high heat generation starting temperature, it is more preferable to use 4,4'-diaminodiphenyl sulfone.

In embodiments of the present invention, it is preferable that the epoxy resin composition further contains a thermoplastic resin. The thermoplastic resin is contained for imparting toughness without impairing control of the tackiness properties of the prepreg to be obtained, control of fluidity of the epoxy resin when heat-curing the prepreg, and heat resistance and elastic modulus of the fiber-reinforced composite material to be obtained. As such a thermoplastic resin, a thermoplastic resin including a polyaryl ether skeleton is preferable, and examples thereof include polysulfones, polyphenyl sulfone, polyether sulfone, polyetherimide, polyphenylene ether, polyether sulfone, and polyether ether sulfone. These thermoplastic resins constituted of a polyaryl ether skeleton may be used singly or used in combination as appropriate. Among them, polyether sulfone is preferable because it enables modification of the epoxy resin while suppressing deterioration in heat resistance and mechanical properties of the fiber-reinforced composite material to be obtained.

<Reinforcing Fiber>

In embodiments of the present invention, the reinforcing fibers are preferably at least one kind of reinforcing fibers selected from the group consisting of carbon fibers and glass fibers from the viewpoint of joining strength and economic efficiency. Besides the above fibers, metal fibers, aromatic polyamide fibers, polyaramid fibers, alumina fibers, silicon carbide fibers, boron fibers, basalt fibers, and the like may be used as the reinforcing fibers as long as the effects of the present invention are not impaired. They may be used singly or may be appropriately used in combination of two or more.

These reinforcing fibers may be subjected to a surface treatment. Examples of the surface treatment include a metal deposition treatment, a treatment with a coupling agent, a treatment with a sizing agent, and an additive attachment treatment.

As the reinforcing fibers, the carbon fibers are preferably used because of the low specific gravity, high strength, and high elastic modulus. Examples of commercially available products of the carbon fibers include "TORAYCA (registered trademark)" T800G-24K, TORAYCA (registered trademark)" T800S-24K, "TORAYCA (registered trademark)" T700G-12K, "TORAYCA (registered trademark)" T700S-12K, "TORAYCA (registered trademark)" T300-3K, and "TORAYCA (registered trademark)" T1100G-24K (all manufactured by Toray Industries, Inc.).

When commercially available reinforcing fiber bundles are used, the number of single fibers can be adjusted by dividing one reinforcing fiber bundle into a plurality of bundles or combining a plurality of bundles, and a strand-shaped prepreg can be obtained through such a step. The single fibers of the reinforcing fibers are preferably oriented in one direction to form a reinforcing fiber bundle, and the single fibers constituting the reinforcing fiber bundle may contain partially cut single fibers.

It is preferable that reinforcing fibers have a strand tensile strength, measured in accordance with the resin-impregnated strand test method in JIS R7608 (2007), of 3.5 GPa or more, because an assembly having excellent joining strength can be obtained. The strand tensile strength is more preferably 4.5 GPa or more.

<Method for Producing Composite Prepreg>

As an example, the composite prepreg according to embodiments of the present invention can be produced by preparing the strand-shaped prepreg (A') containing the thermosetting resin (a) and reinforcing fibers as the region (A) and the strand-shaped prepreg (B') containing the thermosetting resin (b) and reinforcing fibers as the region (B) and arranging the strand-shaped prepreg (A') and the strand-shaped prepreg (B') in combination. Hereinafter the term "strand-shaped prepreg" is a generic term for the strand-shaped prepreg (A') and the strand-shaped prepreg (B').

Examples of a method for arranging the strand-shaped prepreg (A') and the strand-shaped prepreg (B') in combination include a method in which a plurality of strand-shaped prepregs are aligned in one direction, and the strand-shaped prepregs are arranged in an in-plane direction such that side surfaces thereof are in contact with each other to form a sheet, and a method in which a plurality of strand-shaped prepregs are used as warps and wefts to form a sheet having a woven structure while a woven structure is three-dimensionally formed. Examples of the woven structure includes plain weave, twill weave, and satin weave. In the case of the woven structure, it is preferable that one of the warp and the weft is the strand-shaped prepreg (A') and the other is the strand-shaped prepreg (B'). With such a configuration, it is possible to obtain a composite prepreg in which the region (A) and the region (B) exist in a patchwork shape in the in-plane direction on the surface while the region (A) and the region (B) intersect each other and reinforce each other, which is preferable. In addition, the width of the strand-shaped prepreg can be easily controlled by the number of reinforcing fibers contained in each of the strand-shaped prepregs to be combined, and the ratio between the region (A) and the region (B) occupying the surface of the prepreg can be easily controlled.

The strand-shaped prepreg can be produced by various known methods. For example, the prepreg can be produced by a wet process in which a thermosetting resin is dissolved in an organic solvent selected from acetone, methyl ethyl ketone, methanol and the like to reduce its viscosity and impregnated into reinforcing fiber bundles or by a hot-melt process in which a thermosetting resin is heated to reduce its viscosity without using an organic solvent and impregnated into reinforcing fiber bundles. In the wet process, it is possible to immerse the reinforcing fiber bundles in a liquid containing a thermosetting resin, then pull it up, and evaporate the organic solvent using an oven or the like to obtain a prepreg. In the hot-melt process, a method of directly impregnating reinforcing fiber bundles with a thermosetting resin heated to reduce its viscosity, a method of impregnating reinforcing fiber bundles with a thermosetting resin by, first, preparing a release paper sheet with a resin film obtained by once coating a release paper or the like with a thermosetting resin (hereinafter also referred to as "resin film"), then laminating the resin film on the reinforcing fiber bundle side from both sides or one side of the reinforcing fiber bundles, followed by heating and pressurizing, or the like can be used. As a method for producing the strand-shaped prepreg, the hot-melt process of impregnating reinforcing fiber bundles with a thermosetting resin without using an organic solvent is preferable because substantially no organic solvent remains.

In the strand-shaped prepreg, it is preferable that the thermosetting resin has a basis weight of 10 g/m² or more. The basis weight of the thermosetting resin is preferably 50 g/m² or more because it is easy to obtain a sufficient thickness for exhibiting more excellent joining strength, and more preferably 100 g/m² or more. The upper limit of the basis weight is not particularly limited but is preferably 500 g/m² or less from the viewpoint of joining strength and ease of production of the composite prepreg. Here, the basis weight refers to the mass [g] of the material contained per 1 m², which is employed as a unit area.

The basis weight of the reinforcing fibers in the strand-shaped prepreg is preferably 1 to 2,000 g/m², more preferably 30 to 1,000 g/m², and still more preferably 50 to 200 g/m². This range is preferable because the composite prepreg has excellent joining strength and producibility.

The mass content of the reinforcing fibers in the strand-shaped prepreg is preferably 30 to 90% by mass, more preferably 35 to 85% by mass, and still more preferably 40 to 80% by mass. This range is preferable because both the exposed area of the thermosetting resin and the reinforcing effect by the reinforcing fibers can be achieved, and the joining strength of the composite prepreg can be improved.

<Method for Producing Preform and Fiber-Reinforced Composite Material Assembly>

Another aspect of the present invention is a method for producing a fiber-reinforced composite material assembly in which a first prepreg and a second prepreg containing thermosetting resins having different gel times and different heat generation starting temperatures are joined to each other with the composite prepreg according to embodiments of the present invention interposed therebetween. Here, the first and second prepregs are not particularly limited as long as they contain thermosetting resins having different gel times and heat generation starting temperatures. Both the first and second prepregs are prepared separately from the above-described composite prepreg according to embodiments of the present invention but may be configured to be included in the category of the composite prepreg of the present invention. From the viewpoint of joining strength between the prepregs, the combination of the first and second prepregs is preferably a prepreg containing the thermosetting resin (a) used in the interposed composite prepreg and a prepreg containing the thermosetting resin (b) used in the composite prepreg.

Hereinafter, a case will be described in which a prepreg containing the thermosetting resin (a) is used as the first prepreg, a prepreg containing the thermosetting resin (b) is used as the second prepreg, and these prepregs are joined using the composite prepreg of the present invention to provide a fiber-reinforced composite material assembly.

In the method for producing a fiber-reinforced composite material assembly according to embodiments of the present invention, heating for joining the first prepreg and the composite prepreg and heating for joining the second prepreg and the composite prepreg can be performed step by step or simultaneously.

Figure 3:
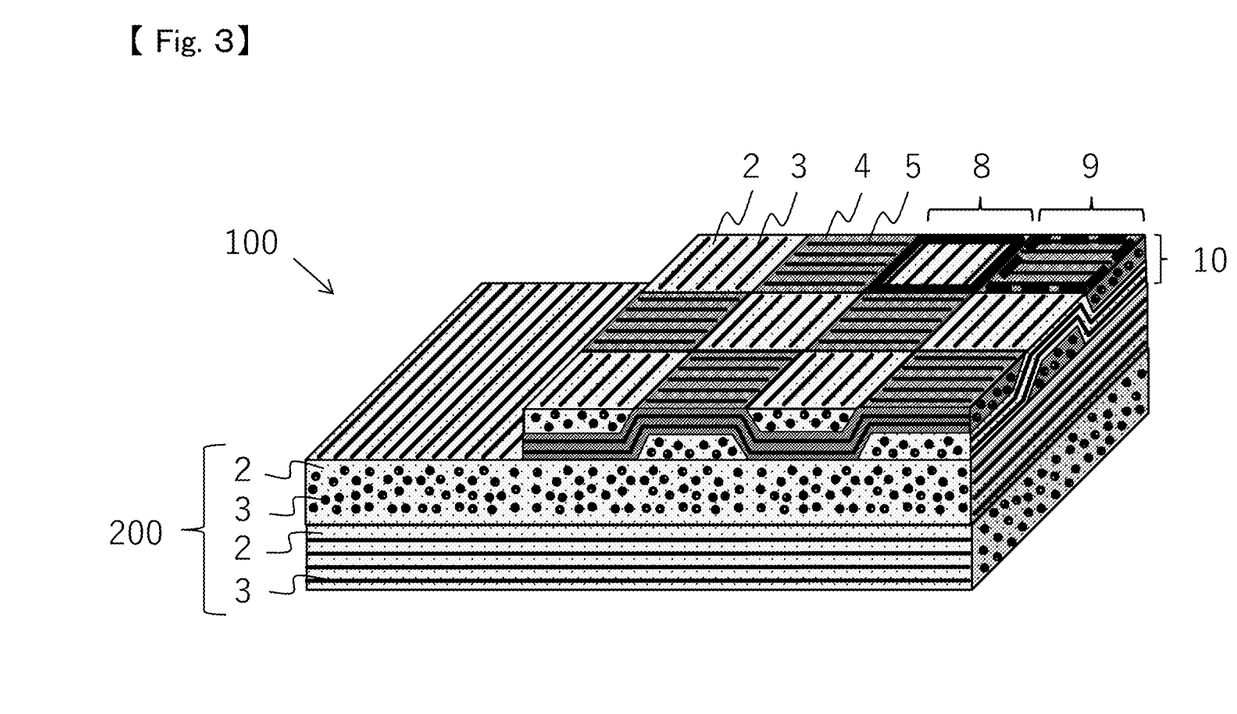
FIG. 3 is a schematic view showing an embodiment of a preform formed by laminating another prepreg containing a thermosetting resin (a) on the composite prepreg of the present invention.

When such heating is performed step by step, first, as shown in FIG. 3, a preform 100 is produced by disposing a first prepreg 200 on one surface of a composite prepreg 10 according to embodiments of the present invention and cured by heating. By setting the heating time in the heat curing of the preform to be equal to or longer than the gel time of the thermosetting resin (a) and shorter than the gel time of the thermosetting resin (b), or setting the heating temperature in the heat curing of the preform to be equal to or higher than the heat generation starting temperature of the thermosetting resin (a) and lower than the heat generation starting temperature of the thermosetting resin (b), it is possible to obtain a fiber-reinforced composite material (joint intermediate) in which the thermosetting resin (b) derived from the composite prepreg exists on the surface in an uncured state. Then, the second prepreg is further laminated on a surface of the fiber-reinforced composite material (joint intermediate) opposite to the surface on which the first prepreg has been laminated and cured by heating, so that a fiber-reinforced composite material assembly (not shown) can be obtained. The heat curing after the second prepreg is laminated is preferably heat molding for a time equal to or longer than the gel time of the thermosetting resin (b) or at a temperature equal to or higher than the heat generation starting temperature of the thermosetting resin (b).

Figure 4:
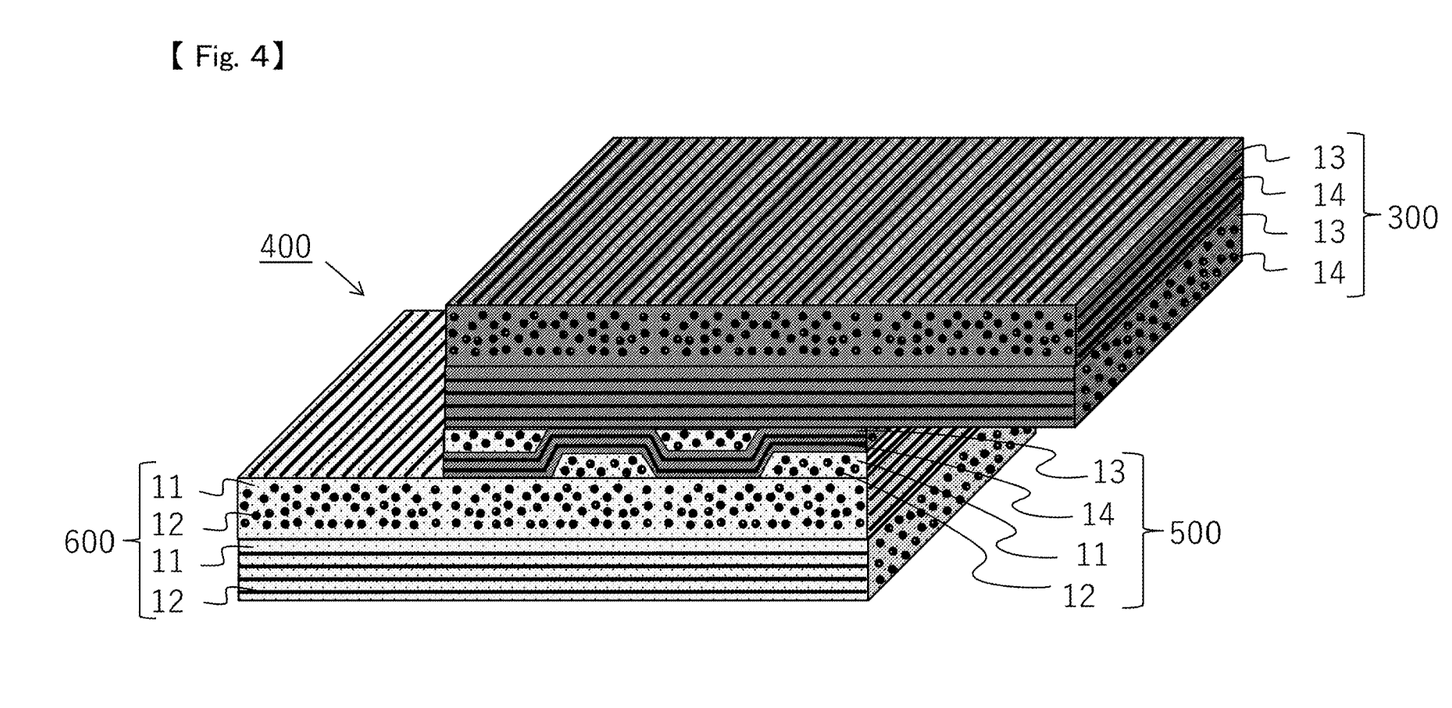
FIG. 4 is a schematic view showing an embodiment of a fiber-reinforced composite material assembly in which another prepreg containing the thermosetting resin (a) and still another prepreg containing a thermosetting resin (b) are joined with the composite prepreg having the configuration of FIG. 2 therebetween.

In the case where heating for joining the first prepreg 200 and the composite prepreg 10 and heating for joining the second prepreg and the composite prepreg 10 are performed simultaneously, for example, the procedure can be as follows. That is, a preform in which the first prepreg containing the thermosetting resin (a) is disposed on one surface of the composite prepreg according to embodiments of the present invention and a second prepreg containing the thermosetting resin (b) is disposed on the other surface is produced and cured by heating. This heat curing is performed for a time equal to or longer than the gel time of the thermosetting resin (b) or at a temperature equal to or higher than the heat generation starting temperature of the thermosetting resin (b), whereby a fiber-reinforced composite material assembly 400 formed by joining a cured product 600 of the first prepreg and a cured product 300 of the second prepreg with a cured product 500 of the composite prepreg therebetween can be obtained by one-step heating as shown in FIG. 4.

By the production method as described above, it is possible to obtain a fiber-reinforced composite material assembly in which a fiber-reinforced composite material containing a cured product of the thermosetting resin (a) and reinforcing fibers and a fiber-reinforced composite material containing a cured product of the thermosetting resin (b) and reinforcing fibers are joined with a cured product of the composite prepreg according to embodiments of the present invention therebetween. Such a fiber-reinforced composite material assembly is excellent in joining strength, and a warp caused by the difference in cure shrinkage rate due to the difference in thermosetting resin type is suppressed.

EXAMPLES

Hereinafter, the present invention will be described in more detail with reference to examples. However, the scope of the present invention is not limited to these examples. Measurements of various characteristics were performed under an environment in which a temperature was 23° C. and a relative humidity was 50% unless otherwise noted.

Abbreviations Used in Tables

[Reinforcing Fiber]
CF-1
Continuous carbon fibers with a total number of 1,000 single fibers obtained by subjecting a copolymer containing polyacrylonitrile as a main component to spinning, a firing treatment, and a surface oxidation treatment. The characteristics are as follows.

Single fiber diameter: 7 μm
Density: 1.8 g/cm$^3$
Tensile strength: 4,600 MPa
Tensile modulus: 220 GPa

[Strand-shaped Prepreg]

PPG-1

To a reactor were put 40 parts by mass of a bisphenol A type epoxy resin ("jER" (registered trademark) 825 (manufactured by Mitsubishi Chemical Corporation)), 60 parts by mass of tetraglycidyldiaminodiphenylmethane ("Araldite (registered trademark)" MY721 (manufactured by Huntsman Advanced Materials)), and 10 parts by mass of polyether sulfone ("SUMIKAEXCEL (registered trademark)" PES5003P (manufactured by Sumitomo Chemical Co., Ltd.)), and they were heated and kneaded to dissolve the polyether sulfone. Then, the temperature was lowered to 100° C. or lower while continuing the kneading, 10 parts by mass of 4,4'-diaminodiphenyl sulfone (SEIKACURE-S (manufactured by Wakayama Seika Kogyo Co., Ltd.)) and 50 parts by mass of 4,4'-diaminodiphenyl ketone were added, the resulting mixture was stirred, and the resulting kneaded product was coated on release paper using a knife coater to produce a thermosetting resin film (basis weight: 50 g/m$^2$). This thermosetting resin film was overlaid on both sides of a reinforcing fiber strand (basis weight: 193 g/m$^2$) obtained by aligning the carbon fibers CF-1 in one direction, and the carbon fibers were impregnated with the thermosetting resin by heating and pressurizing using a heat roll to provide a strand-shaped prepreg (PPG-1).

PPG-2

To a reactor were put 40 parts by mass of a bisphenol A type epoxy resin ("jER" (registered trademark) 825 (manufactured by Mitsubishi Chemical Corporation)), 60 parts by mass of tetraglycidyldiaminodiphenylmethane ("Araldite (registered trademark)" MY721 (manufactured by Huntsman Advanced Materials)), and 10 parts by mass of polyether sulfone ("SUMIKAEXCEL (registered trademark)" PES5003P (manufactured by Sumitomo Chemical Co., Ltd.)), and they were heated and kneaded to dissolve the polyether sulfone. Then, the temperature was lowered to 100° C. or lower while continuing the kneading, and 47 parts by mass of 4,4'-diaminodiphenyl sulfone (SEIKACURE-S (manufactured by Wakayama Seika Kogyo Co., Ltd.)) was added, the resulting mixture was stirred, and the resulting kneaded product was coated on release paper using a knife coater to produce a thermosetting resin film (basis weight: 50 g/m$^2$). This thermosetting resin film was overlaid on both sides of a reinforcing fiber strand (basis weight: 193 g/m$^2$) obtained by aligning the carbon fibers CF-1 in one direction, and the carbon fibers were impregnated with the thermosetting resin by heating and pressurizing using a heat roll to provide a strand-shaped prepreg (PPG-2).

PPG-3

To a reactor were put 40 parts by mass of a bisphenol A type epoxy resin ("jER" (registered trademark) 825 (manufactured by Mitsubishi Chemical Corporation)), 60 parts by mass of tetraglycidyldiaminodiphenylmethane ("Araldite (registered trademark)" MY721 (manufactured by Huntsman Advanced Materials)), and 10 parts by mass of polyether sulfone ("SUMIKAEXCEL (registered trademark)" PES5003P (manufactured by Sumitomo Chemical Co., Ltd.)), and they were heated and kneaded to dissolve the polyether sulfone. Then, the temperature was lowered to 100° C. or lower while continuing the kneading, and 40 parts by mass of 4,4'-diaminodiphenyl ketone was added, the resulting mixture was stirred, and the resulting kneaded product was coated on release paper using a knife coater to produce a thermosetting resin film (basis weight: 50 g/m$^2$). This thermosetting resin film was overlaid on both sides of a reinforcing fiber strand (basis weight: 193 g/m$^2$) obtained by aligning the carbon fibers CF-1 in one direction, and the carbon fibers were impregnated with the thermosetting resin by heating and pressurizing using a heat roll to provide a strand-shaped prepreg (PPG-3).

PPG-4

To a reactor were put 40 parts by mass of a bisphenol A type epoxy resin ("jER" (registered trademark) 825 (manufactured by Mitsubishi Chemical Corporation)), 60 parts by mass of tetraglycidyldiaminodiphenylmethane ("Araldite (registered trademark)" MY721 (manufactured by Huntsman Advanced Materials)), and 10 parts by mass of polyether sulfone ("SUMIKAEXCEL (registered trademark)" PES5003P (manufactured by Sumitomo Chemical Co., Ltd.)), and they were heated and kneaded to dissolve the polyether sulfone. Then, the temperature was lowered to 100° C. or lower while continuing the kneading, and 40 parts by mass of 4,4'-diaminodiphenylphosphinic acid was added, the resulting mixture was stirred, and the resulting kneaded product was coated on release paper using a knife coater to produce a thermosetting resin film (basis weight: 50 g/m$^2$). This thermosetting resin film was overlaid on both sides of a reinforcing fiber strand (basis weight: 193 g/m$^2$) obtained by aligning the carbon fibers CF-1 in one direction, and the carbon fibers were impregnated with the thermosetting resin by heating and pressurizing using a heat roll to provide a strand-shaped prepreg (PPG-4).

PPG-5

To a reactor were put 100 parts by mass of a bisphenol A type epoxy resin ("jER" (registered trademark) 825 (manufactured by Mitsubishi Chemical Corporation)) and 10 parts by mass of polyether sulfone ("SUMIKAEXCEL (registered trademark)" PES5003P (manufactured by Sumitomo Chemical Co., Ltd.)), and they were heated and kneaded to dissolve the polyether sulfone. Then, the temperature was lowered to 100° C. or lower while continuing the kneading, and 35 parts by mass of 4,4'-diaminodiphenyl sulfone (SEIKACURE-S (manufactured by Wakayama Seika Kogyo Co., Ltd.)) was added, the resulting mixture was stirred, and the resulting kneaded product was coated on release paper using a knife coater to produce a thermosetting resin film (basis weight: 50 g/m$^2$). This thermosetting resin film was overlaid on both sides of a reinforcing fiber strand (basis weight: 193 g/m$^2$) obtained by aligning the carbon fibers CF-1 in one direction, and the carbon fibers were impregnated with the thermosetting resin by heating and pressurizing using a heat roll to provide a strand-shaped prepreg (PPG-5).

PPG-6

At 40° C., 100 parts by mass of a bisphenol A type epoxy resin ("jER" (registered trademark) 825 (manufactured by Mitsubishi Chemical Corporation) was heated and kneaded, 26 parts by mass of diethyltoluenediamine ("Aradur" (registered trademark) 5200 (manufactured by Huntsman Advanced Materials)) was added thereto, the resulting mixture was stirred, and the resulting kneaded product was coated on release paper using a knife coater to produce a thermosetting resin film (basis weight: 50 g/m$^2$). This thermosetting resin film was overlaid on both sides of a reinforcing fiber strand (basis weight: 193 g/m$^2$) obtained by aligning the carbon fibers CF-1 in one direction, and the carbon fibers were impregnated with the thermosetting resin by heating and pressurizing using a heat roll to provide a strand-shaped prepreg (PPG-6).

PPG-7

At 40° C., 100 parts by mass of a bisphenol A type epoxy resin ("jER" (registered trademark) 825 (manufactured by Mitsubishi Chemical Corporation) was heated and kneaded, 35 parts by mass of 4,4'-diaminodiphenyl sulfone (SEIKA-CURE-S, manufactured by Wakayama Seika Kogyo Co., Ltd.) was added thereto, the resulting mixture was stirred, and the resulting kneaded product was coated on release paper using a knife coater to produce a thermosetting resin film (basis weight: 50 g/m$^2$). This thermosetting resin film was overlaid on both sides of a reinforcing fiber strand (basis weight: 193 g/m$^2$) obtained by aligning the carbon fibers CF-1 in one direction, and the carbon fibers were impregnated with the thermosetting resin by heating and pressurizing using a heat roll to provide a strand-shaped prepreg (PPG-7).

PPG-8

At 40° C., 100 parts by mass of a bisphenol A type epoxy resin ("jER" (registered trademark) 825 (manufactured by Mitsubishi Chemical Corporation) was heated and kneaded, 35 parts by mass of 3,3'-diaminodiphenyl sulfone (3,3'-DAS, manufactured by Mitsui Fine Chemical, Inc.) was added thereto, the resulting mixture was stirred, and the resulting kneaded product was coated on release paper using a knife coater to produce a thermosetting resin film (basis weight: 50 g/m$^2$). This thermosetting resin film was overlaid on both sides of a reinforcing fiber strand (basis weight: 193 g/m$^2$) obtained by aligning the carbon fibers CF-1 in one direction, and the carbon fibers were impregnated with the thermosetting resin by heating and pressurizing using a heat roll to provide a strand-shaped prepreg (PPG-8).

PPG-9

At 40° C., 100 parts by mass of a bisphenol A type epoxy resin ("jER" (registered trademark) 825 (manufactured by Mitsubishi Chemical Corporation) was heated and kneaded, 33 parts by mass of 4,4'-diaminobenzanilide was added thereto, the resulting mixture was stirred, and the resulting kneaded product was coated on release paper using a knife coater to produce a thermosetting resin film (basis weight: 50 g/m$^2$). This thermosetting resin film was overlaid on both sides of a reinforcing fiber strand (basis weight: 193 g/m$^2$) obtained by aligning the carbon fibers CF-1 in one direction, and the carbon fibers were impregnated with the thermosetting resin by heating and pressurizing using a heat roll to provide a strand-shaped prepreg (PPG-9).

PPG-10

At 40° C., 100 parts by mass of a bisphenol A type epoxy resin ("jER" (registered trademark) 825 (manufactured by Mitsubishi Chemical Corporation) was heated and kneaded, 29 parts by mass of 4,4'-diaminodiphenylmethane was added thereto, the resulting mixture was stirred, and the resulting kneaded product was coated on release paper using a knife coater to produce a thermosetting resin film (basis weight: 50 g/m$^2$). This thermosetting resin film was overlaid on both sides of a reinforcing fiber strand (basis weight: 193 g/m$^2$) obtained by aligning the carbon fibers CF-1 in one direction, and the carbon fibers were impregnated with the thermosetting resin by heating and pressurizing using a heat roll to provide a strand-shaped prepreg (PPG-10).

<Evaluation Method>

(1) Method for Measuring Gel Time

The thermosetting resin was taken out from the thermosetting resin film before being used for the strand-shaped prepreg, and the curing reactivity of the epoxy resin composition was evaluated from the time variation of the rotational torque measured with a curelastometer. Here, using Rubber Process Analyzer RPA2000 (manufactured by ALPHA TECHNOLOGIES), the temperature is raised from 40° C. to 180° C. at a rate of 1.7° C./min, and heating is performed at 180° C. for 2 hours. The time period required for the torque to exceeded 1 dNm from the start of heating at 40° C. was defined as the gel time. When the gel time of the thermosetting resin used is measured using the composite prepreg itself, the composite prepreg is divided into strand-shaped prepregs, and each strand-shaped prepreg is heated and pressurized at 40° C. and 5 MPa for 10 minutes to allow the thermosetting resin to flow from between reinforcing fibers, and the extracted thermosetting resin is used for evaluation with the curelastometer.

(2) Method for Measuring Heat Generation Starting Temperature

The thermosetting resin was taken out from the thermosetting resin film before being used for the strand-shaped prepreg, and the heat generation starting temperature was evaluated using a differential scanning calorimeter. Here, in the differential scanning calorimetry chart measured at 5° C./min with DSC Q2000 (manufactured by TA Instruments) at a starting temperature of 40° C., the rising point of the exothermic peak (the point at which 0.2 W/g of heat was generated from the baseline) was defined as the heat generation starting temperature. When the heat generation starting temperature of the thermosetting resin used is measured using the composite prepreg itself, the composite prepreg is divided into strand-shaped prepregs, and each strand-shaped prepreg is heated and pressurized at 40° C. and 5 MPa for 10 minutes to allow the thermosetting resin to flow from between reinforcing fibers, and the extracted thermosetting resin is used for evaluation with the differential scanning calorimeter.

(3) Method for Measuring Ratio of Region (A) on Surface of Composite Prepreg

The area [mm$^2$] of each of all the region (A) and region (B) arranged in the in-plane direction on the surface of the composite prepreg was measured, and the ratio [%] of the region (A) on the surface of the composite prepreg was determined by dividing the sum of the areas of the regions (A) by the sum of the areas of the region (A) and region (B) and then multiplying the result by 100.

(4) Method for Evaluating Joining Using Difference in Gel Time

The composite prepreg produced in each of the examples and comparative examples was cut into a width of 250 mm and a length of 12.5 mm. In addition, 500 strand-shapedprepregs (A') used for the composite prepreg were aligned and arranged in a square shaped sheet having a width of 300 mm. Four such sheets were prepared, laminated so that the strand-shaped prepregs (A') had a layer constitution in which the orientations were [0°/90°/90°/0°], and then cut to a width of 250 mm and a length of 92.5 mm to provide a laminate. Here, the length direction was set to 0°. Further, the composite prepreg and the laminate composed of the prepreg (A') were arranged so as to be aligned at both ends in the width direction and one end in the length direction to form a preform. The preform was heated at 180° C. under a pressure of 0.5 MPa for the gel time of the thermosetting resin (a) to provide a fiber-reinforced composite material.

Further, 500 strand-shaped prepregs (B') used for the composite prepreg were aligned and arranged in a square shaped sheet having a width of 300 mm. Four such sheets were prepared, laminated so that the strand-shaped prepregs (B') had a layer constitution in which the orientations were [0°/90°/90°/0°], and then cut to a width of 250 mm and a length of 92.5 mm to provide a laminate. Then, the laminate composed of the prepreg (B') was laminated on the fiber-reinforced composite material so as to be aligned on the opposite side to the side on which the laminate composed of the prepreg (A') was aligned, of both ends in the width direction and one end in the length direction. Subsequently, a pressure of 0.5 MPa was applied at 180° C. and heating was performed for the gel time of the thermosetting resin (b) to provide a fiber-reinforced composite material having a joint structure, and the fiber-reinforced composite material was further cut out so that the interval in the width direction was 25 mm to produce a test piece.

Using the obtained test piece, the joining strength was evaluated in accordance with ISO 4587: 1995 (JIS K6850 (1999)). A value obtained by dividing the maximum load at the time of the test by the joint area was defined as the joining strength [MPa], and evaluation was performed in the following three grades, and good and fair were regarded as acceptable.
    good: The joining strength is 10 MPa or more.
    fair: The joining strength is 3 MPa or more and less than 10 MPa.
    bad: The joining strength is less than 3 MPa.

(5) Method for Evaluating Joining Using Difference in Heat Generation Starting Temperature The composite prepreg produced in each of the examples and comparative examples was cut into a width of 250 mm and a length of 12.5 mm. In addition, 500 strand-shape-dprepregs (A') used for the composite prepreg were aligned and arranged in a square shaped sheet having a width of 300 mm. Four such sheets were prepared, laminated so that the strand-shaped prepregs (A') had a layer constitution in which the orientations were [0°/90°/90°/0°], and then cut to a width of 250 mm and a length of 92.5 mm to provide a laminate. Here, the length direction was set to 0°. Further, the composite prepreg and the laminate composed of the prepreg (A') were arranged so as to be aligned at both ends in the width direction and one end in the length direction to form a preform. The preform was heated at the heat generation starting temperature of the thermosetting resin (a) under a pressure of 0.5 MPa for 10 minutes to provide a fiber-reinforced composite material.

Further, 500 strand-shaped prepregs (B') used for the composite prepreg were aligned and arranged in a square shaped sheet having a width of 300 mm. Four such sheets were prepared, laminated so that the strand-shaped prepregs (B') had a layer constitution in which the orientations were [099099090° ], and then cut to a width of 250 mm and a length of 92.5 mm to provide a laminate. Then, the laminate composed of the prepreg (B') was laminated on the fiber-reinforced composite material so as to be aligned on the opposite side to the side on which the laminate composed of the prepreg (A') was aligned, of both ends in the width direction and one end in the length direction. Subsequently, a pressure of 0.5 MPa was applied at the heat generation starting temperature of the thermosetting resin (b), and heating was performed for 120 minutes to provide a fiber-reinforced composite material having a joint structure, and the fiber-reinforced composite material was further cut out so that the interval in the width direction was 25 mm to produce a test piece.

Using the obtained test piece, the joining strength was evaluated in accordance with ISO 4587: 1995 (JIS K6850 (1999)). A value obtained by dividing the maximum load at the time of the test by the joint area was defined as the joining strength [MPa], and evaluation was performed in the following three grades, and good and fair were regarded as acceptable.
    good: The joining strength is 10 MPa or more.
    fair: The joining strength is 3 MPa or more and less than 10 MPa.
    bad: The joining strength is less than 3 MPa.

Example 1

PPG-1 was used as the strand-shaped prepreg (A'), and PPG-2 was used as the strand-shaped prepreg (B'). As shown in FIG. 2, 500 strand-shaped prepregs (A') aligned in one direction and 500 strand-shaped prepregs (B') aligned in a fiber orientation direction orthogonal thereto were alternately woven such that the distribution of the region (A) and region (B) on the surface of the composite prepreg to be formed was patchwork-shaped to form a plain weave fabric, thereby providing a square composite prepreg having a side of 300 mm. The obtained composite prepreg was evaluated by the method of (4). The evaluation results are shown in Table 1.

Example 2

PPG-1 was used as the strand-shaped prepreg (A'), and PPG-2 was used as the strand-shaped prepreg (B'). As shown in FIG. 1, 250 each of strand-shaped prepregs (A') and strand-shaped prepregs (B') were aligned in one direction so as to be alternately repeated such that the region (A) and region (B) are distributed in a stripe shape on the surface of the composite prepreg to be formed, thereby providing a square composite prepreg having a side of 300 mm. The obtained composite prepreg was evaluated by the method of (4). The evaluation results are shown in Table 1.

Example 3

A composite prepreg was obtained in the same manner as in Example 2 except that the use ratio of the strand-shaped prepreg (A') was doubled, and two strand-shaped prepregs (A') and one strand-shaped prepreg (B') were alternately disposed. The obtained composite prepreg was evaluated by the method of (4). The evaluation results are shown in Table 1.

Example 4

A composite prepreg was obtained in the same manner as in Example 1 except that the strand-shaped prepreg (A') was changed from PPG-1 to PPG-3. The obtained composite prepreg was evaluated by the method of (4). The evaluation results are shown in Table 1.

Example 5

A composite prepreg was obtained in the same manner as in Example 1 except that the strand-shaped prepreg (A') was changed from PPG-1 to PPG-4 and that the strand-shaped prepreg (B') was changed from PPG-2 to PPG-5. The obtained composite prepreg was evaluated by the method of (4). The evaluation results are shown in Table 1.

Comparative Example 1

A composite prepreg was obtained in the same manner as in Example 1 except that the strand-shaped prepreg (B') was changed from PPG-2 to PPG-1. The obtained composite prepreg was evaluated by the method of (4). The evaluation results are shown in Table 1.

Comparative Example 2

A composite prepreg was obtained in the same manner as in Example 1 except that the strand-shaped prepreg (A') was changed from PPG-1 to PPG-2. The obtained composite prepreg was evaluated by the method of (4). The evaluation results are shown in Table 1.

Comparative Example 3

A composite prepreg was obtained in the same manner as in Example 2 except that the strand-shaped prepreg (B') was changed from PPG-2 to PPG-1. The obtained composite prepreg was evaluated by the method of (4). The evaluation results are shown in Table 1.

Comparative Example 4

A composite prepreg was obtained in the same manner as in Example 1 except that the strand-shaped prepreg (A') was changed from PPG-1 to PPG-5. The obtained composite prepreg was evaluated by the method of (4). The evaluation results are shown in Table 1.

the composite prepreg to be formed, thereby providing a square composite prepreg having a side of 300 mm. The obtained composite prepreg was evaluated by the method of (5). The results of the evaluation are shown in Table 2.

Example 7

PPG-6 was used as the strand-shaped prepreg (A'), and PPG-8 was used as the strand-shaped prepreg (B'). As shown in FIG. 1, 250 each of strand-shaped prepregs (A') and strand-shaped prepregs (B') were aligned in one direction so as to be alternately repeated such that the region (A) and region (B) are distributed in a stripe shape on the surface of the composite prepreg to be formed, thereby providing a square composite prepreg having a side of 300 mm. The obtained composite prepreg was evaluated by the method of (5). The results of the evaluation are shown in Table 2.

Example 8

PPG-9 was used as the strand-shaped prepreg (A'), and PPG-8 was used as the strand-shaped prepreg (B'). As shown in FIG. 1, 250 each of strand-shaped prepregs (A') and strand-shaped prepregs (B') were aligned in one direction so as to be alternately repeated such that the region (A) and region (B) are distributed in a stripe shape on the surface of

TABLE 1-1

|  |  | Example 1 | Example 2 | Example 3 | Example 4 | Example 5 |
|---|---|---|---|---|---|---|
| $T_a$ | min | 58 | 58 | 58 | 69 | 76 |
| $T_b$ | min | 105 | 105 | 105 | 105 | 98 |
| $T_a/T_b$ | — | 0.55 | 0.55 | 0.55 | 0.66 | 0.78 |
| Ratio of region (A) on surface of composite prepreg | % | 50 | 50 | 67 | 50 | 50 |
| Distribution of region (A) and region (B) on surface of composite prepreg | — | Patchwork | Stripe | Stripe | Patchwork | Patchwork |
| Joining strength of assembly | — | good | fair | fair | good | fair |

TABLE 1-2

|  |  | Comparative Example 1 | Comparative Example 2 | Comparative Example 3 | Comparative Example 4 |
|---|---|---|---|---|---|
| $T_a$ | min | 58 | 105 | 58 | 98 |
| $T_b$ | min | 58 | 105 | 58 | 105 |
| $T_a/T_b$ | — | 1 | 1 | 1 | 0.93 |
| Ratio of region (A) on surface of composite prepreg | % | 50 | 50 | 50 | 50 |
| Distribution of region (A) and region (B) on surface of composite prepreg | — | Patchwork | Patchwork | Stripe | Patchwork |
| Joining strength of assembly | — | bad | bad | bad | bad |

Example 6

PPG-6 was used as the strand-shaped prepreg (A'), and PPG-7 was used as the strand-shaped prepreg (B'). As shown in FIG. 1, 250 each of strand-shaped prepregs (A') and strand-shaped prepregs (B') were aligned in one direction so as to be alternately repeated such that the region (A) and region (B) are distributed in a stripe shape on the surface of the composite prepreg to be formed, thereby providing a square composite prepreg having a side of 300 mm. The obtained composite prepreg was evaluated by the method of (5). The results of the evaluation are shown in Table 2.

Example 9

A composite prepreg was obtained in the same manner as in Example 8 except that the use ratio of the strand-shaped prepreg (A') was doubled, and two strand-shaped prepregs (A') and one strand-shaped prepreg (B') were alternately disposed. The obtained composite prepreg was evaluated by the method of (5). The evaluation results are shown in Table 1.

Comparative Example 5

PPG-6 was used as the strand-shaped prepreg (A'), and PPG-9 was used as the strand-shaped prepreg (B'). As shown in FIG. 1, 250 each of strand-shaped prepregs (A') and strand-shaped prepregs (B') were aligned in one direction so as to be alternately repeated such that the region (A) and region (B) are distributed in a stripe shape on the surface of the composite prepreg to be formed, thereby providing a square composite prepreg having a side of 300 mm. The obtained composite prepreg was evaluated by the method of (5). The results of the evaluation are shown in Table 2.

Comparative Example 6

PPG-10 was used as the strand-shaped prepreg (A'), and PPG-6 was used as the strand-shaped prepreg (B'). As shown in FIG. 1, 250 each of strand-shaped prepregs (A') and strand-shaped prepregs (B') were aligned in one direction so as to be alternately repeated such that the region (A) and region (B) are distributed in a stripe shape on the surface of the composite prepreg to be formed, thereby providing a square composite prepreg having a side of 300 mm. The obtained composite prepreg was evaluated by the method of (5). The results of the evaluation are shown in Table 2.

Comparative Example 7

PPG-7 was used as the strand-shaped prepreg (A'), and PPG-7 was used as the strand-shaped prepreg (B'). As shown in FIG. 1, 250 each of strand-shaped prepregs (A') and strand-shaped prepregs (B') were aligned in one direction so as to be alternately repeated such that the region (A) and region (B) are distributed in a stripe shape on the surface of the composite prepreg to be formed, thereby providing a square composite prepreg having a side of 300 mm. The obtained composite prepreg was evaluated by the method of (5). The results of the evaluation are shown in Table 2.

Comparative Example 8

PPG-6 was used as the strand-shaped prepreg (A'), and PPG-6 was used as the strand-shaped prepreg (B'). As shown in FIG. 1, 250 each of strand-shaped prepregs (A') and strand-shaped prepregs (B') were aligned in one direction so as to be alternately repeated such that the region (A) and region (B) are distributed in a stripe shape on the surface of the composite prepreg to be formed, thereby providing a square composite prepreg having a side of 300 mm. The obtained composite prepreg was evaluated by the method of (5). The results of the evaluation are shown in Table 2.

Example 10

PPG-6 was used as the strand-shaped prepreg (A'), and PPG-7 was used as the strand-shaped prepreg (B'). As shown in FIG. 2, 500 strand-shaped prepregs (A') aligned in one direction and 500 strand-shaped prepregs (B') aligned in a fiber orientation direction orthogonal thereto were alternately woven such that the distribution of the region (A) and region (B) on the surface of the composite prepreg to be formed was patchwork-shaped to form a plain weave fabric, thereby providing a square composite prepreg having a side of 300 mm. The obtained composite prepreg was evaluated by the method of (5). The results of the evaluation are shown in Table 2.

Example 11

PPG-6 was used as the strand-shaped prepreg (A'), and PPG-8 was used as the strand-shaped prepreg (B'). As shown in FIG. 2, 500 strand-shaped prepregs (A') aligned in one direction and 500 strand-shaped prepregs (B') aligned in a fiber orientation direction orthogonal thereto were alternately woven such that the distribution of the region (A) and region (B) on the surface of the composite prepreg to be formed was patchwork-shaped to form a plain weave fabric, thereby providing a square composite prepreg having a side of 300 mm. The obtained composite prepreg was evaluated by the method of (5). The results of the evaluation are shown in Table 2.

Example 12

PPG-9 was used as the strand-shaped prepreg (A'), and PPG-8 was used as the strand-shaped prepreg (B'). As shown in FIG. 2, 500 strand-shaped prepregs (A') aligned in one direction and 500 strand-shaped prepregs (B') aligned in a fiber orientation direction orthogonal thereto were alternately woven such that the distribution of the region (A) and region (B) on the surface of the composite prepreg to be formed was patchwork-shaped to form a plain weave fabric, thereby providing a square composite prepreg having a side of 300 mm. The obtained composite prepreg was evaluated by the method of (5). The results of the evaluation are shown in Table 2.

Comparative Example 9

PPG-6 was used as the strand-shaped prepreg (A'), and PPG-6 was used as the strand-shaped prepreg (B'). As shown in FIG. 2, 500 strand-shaped prepregs (A') aligned in one direction and 500 strand-shaped prepregs (B') aligned in a fiber orientation direction orthogonal thereto were alternately woven such that the distribution of the region (A) and region (B) on the surface of the composite prepreg to be formed was patchwork-shaped to form a plain weave fabric, thereby providing a square composite prepreg having a side of 300 mm. The obtained composite prepreg was evaluated by the method of (5). The results of the evaluation are shown in Table 2.

TABLE 2-1

|  |  | Example 6 | Example 7 | Example 8 | Example 9 | Comparative Example 5 | Comparative Example 6 |
|---|---|---|---|---|---|---|---|
| Ea | ° C. | 120 | 120 | 129 | 129 | 120 | 118 |
| Eb | ° C. | 175 | 166 | 166 | 166 | 129 | 120 |
| Eb − Ea | ° C. | 55 | 46 | 37 | 37 | 9 | 2 |
| Ratio of region (A) on surface of composite prepreg | % | 50 | 50 | 50 | 67 | 50 | 50 |
| Distribution of region (A) and region (B) on surface of composite prepreg | — | Stripe | Stripe | Stripe | Stripe | Stripe | Stripe |
| Joining strength of assembly | — | good | good | fair | fair | bad | bad |

TABLE 2-2

|  |  | Comparative Example 7 | Comparative Example 8 | Example 10 | Example 11 | Example 12 | Comparative Example 9 |
|---|---|---|---|---|---|---|---|
| Ea | ° C. | 175 | 120 | 120 | 120 | 129 | 120 |
| Eb | ° C. | 175 | 120 | 175 | 166 | 166 | 120 |
| Eb − Ea | ° C. | 0 | 0 | 55 | 46 | 37 | 0 |
| Ratio of region (A) on surface of composite prepreg | % | 50 | 50 | 50 | 50 | 50 | 50 |
| Distribution of region (A) and region (B) on surface of composite prepreg | — | Stripe | Stripe | Patchwork | Patchwork | Patchwork | Patchwork |
| Joining strength of assembly | — | bad | bad | good | good | good | bad |

The composite prepreg according to embodiments of the present invention can be suitably applied to a product having a complicated shape that requires joining in the manufacture of structural components and sub-structural components for aircraft and automobiles, housings of notebook computers, and the like.

DESCRIPTION OF REFERENCE SIGNS

1: Composite prepreg in which regions (A) and regions (B) are distributed in stripe shape in in-plane direction
2: Thermosetting resin (a)
3: Reinforcing fiber contained in strand-shaped prepreg (A')
4: Thermosetting resin (b)
5: Reinforcing fiber contained in strand-shaped prepreg (B')
6: Region (A)
7: Region (B)
8: Region (A) on prepreg surface
9: Region (B) on prepreg surface
10: Composite prepreg in which regions (A) and regions (B) are distributed in patchwork shape in in-plane direction on prepreg surface
11: Cured product of thermosetting resin (a)
12: Reinforcing fiber contained in cured product of thermosetting resin (a)
13: Cured product of thermosetting resin (b)
14: Reinforcing fiber contained in cured product of thermosetting resin (b)
100: Preform in which first prepreg 200 is disposed on one surface of composite prepreg 10
200: First prepreg containing thermosetting resin (a)
300: Cured product of second prepreg containing thermosetting resin (b)
400: Fiber-reinforced composite material assembly in which first prepreg and second prepreg are joined and cured with composite prepreg therebetween
500: Cured product of composite prepreg in which regions (A) and regions (B) are distributed in patchwork shape in in-plane direction on prepreg surface
600: Cured product of first prepreg containing thermosetting resin (a)

The invention claimed is:
1. A composite prepreg comprising:
a region (A) containing a thermosetting resin (a) and a reinforcing fiber; and
a region (B) containing a thermosetting resin (b) and a reinforcing fiber,
the composite prepreg satisfying conditions (i) and (ii) or satisfying conditions (ii) and (iii):
(i) the thermosetting resin (b) is a resin having a gel time longer than a gel time of the thermosetting resin (a), and in at least a part of a temperature range of 40° C. or more and 180°C or less, a gel time Ta of the thermosetting resin (a) and a gel time Tb of the thermosetting resin (b) satisfy Ta/Tb ≤ 0.8,
(ii) a ratio of an area of the region (A) on a surface of the composite prepreg to a sum of the area of the region (A) and an area of the region (B) on the surface of the composite prepreg is 20 to 80%, and
(iii) the thermosetting resin (b) is a resin having a higher heat generation starting temperature than a heat generation starting temperature of the thermosetting resin (a), and in a differential scanning calorimetry chart obtained by measuring at 5° C./min with 40° C. as a starting temperature, a heat generation starting temperature Ea of the thermosetting resin (a) and a heat generation starting temperature Eb of the thermosetting resin (b) satisfy Eb−Ea≥30.

2. The composite prepreg according to claim 1, wherein the region (A) and the region (B) are distributed in a stripe shape or a patchwork shape in an in-plane direction on the surface of the composite prepreg.

3. The composite prepreg according to claim 1, wherein
the region (A) is constituted of a strand-shaped prepreg (A') containing the thermosetting resin (a) and the reinforcing fiber, and
the region (B) is constituted of a strand-shaped prepreg (B') containing the thermosetting resin (b) and the reinforcing fiber.

4. The composite prepreg according to claim 3, wherein the strand-shaped prepreg (A') and the strand-shaped prepreg (B') are arranged in a sheet shape having a woven structure.

5. The composite prepreg according to any of claim 3, wherein the strand-shaped prepreg (A') and the strand-shaped prepreg (B') are arranged in parallel.

6. The composite prepreg according to claim 3, wherein a number of reinforcing fibers contained in each of the strand-shaped prepreg (A') and the strand-shaped prepreg (B') is 10 or more and 800,000 or less.

7. The composite prepreg according to claim 1, wherein, when the conditions (i) and (ii) are satisfied, the gel time Ta of the thermosetting resin (a) and the gel time Tb of the thermosetting resin (b) at 180° C. satisfy Ta/Tb≤0.8.

8. A preform comprising:
the composite prepreg according to claim 1; and
a prepreg containing the thermosetting resin (a), the prepreg being different from the composite prepreg, disposed on at least one surface of the composite prepreg.

9. A fiber-reinforced composite material assembly obtained by heat-molding the preform according to claim 8.

10. A preform comprising:
the composite prepreg according to claim 1;
a prepreg containing the thermosetting resin (a), the prepreg being different from the composite prepreg, disposed on one surface of the composite prepreg; and
a prepreg containing the thermosetting resin (b), the prepreg being different from the composite prepreg, disposed on another surface of the composite prepreg.

11. A method for producing a fiber-reinforced composite material assembly, the method comprising:
preparing a first prepreg and a second prepreg different from the composite prepreg; and
interposing the composite prepreg according to claim 1 to join the first prepreg and the second prepreg.

12. The method for producing a fiber-reinforced composite material assembly according to claim 11, wherein heating for joining the first prepreg and the composite prepreg and heating for joining the second prepreg and the composite prepreg is performed step by step.

13. The method for producing a fiber-reinforced composite material assembly according to claim 11, wherein the first prepreg is a prepreg containing the thermosetting resin (a).

14. The method for producing a fiber-reinforced composite material assembly according to claim 11, wherein the second prepreg is a prepreg containing the thermosetting resin (b).

* * * * *